April 6, 1954 J. A. GALAZZI ET AL 2,674,430
SUPPORT FOR AIR CONDITIONING APPARATUS
Filed Nov. 24, 1950 3 Sheets-Sheet 1
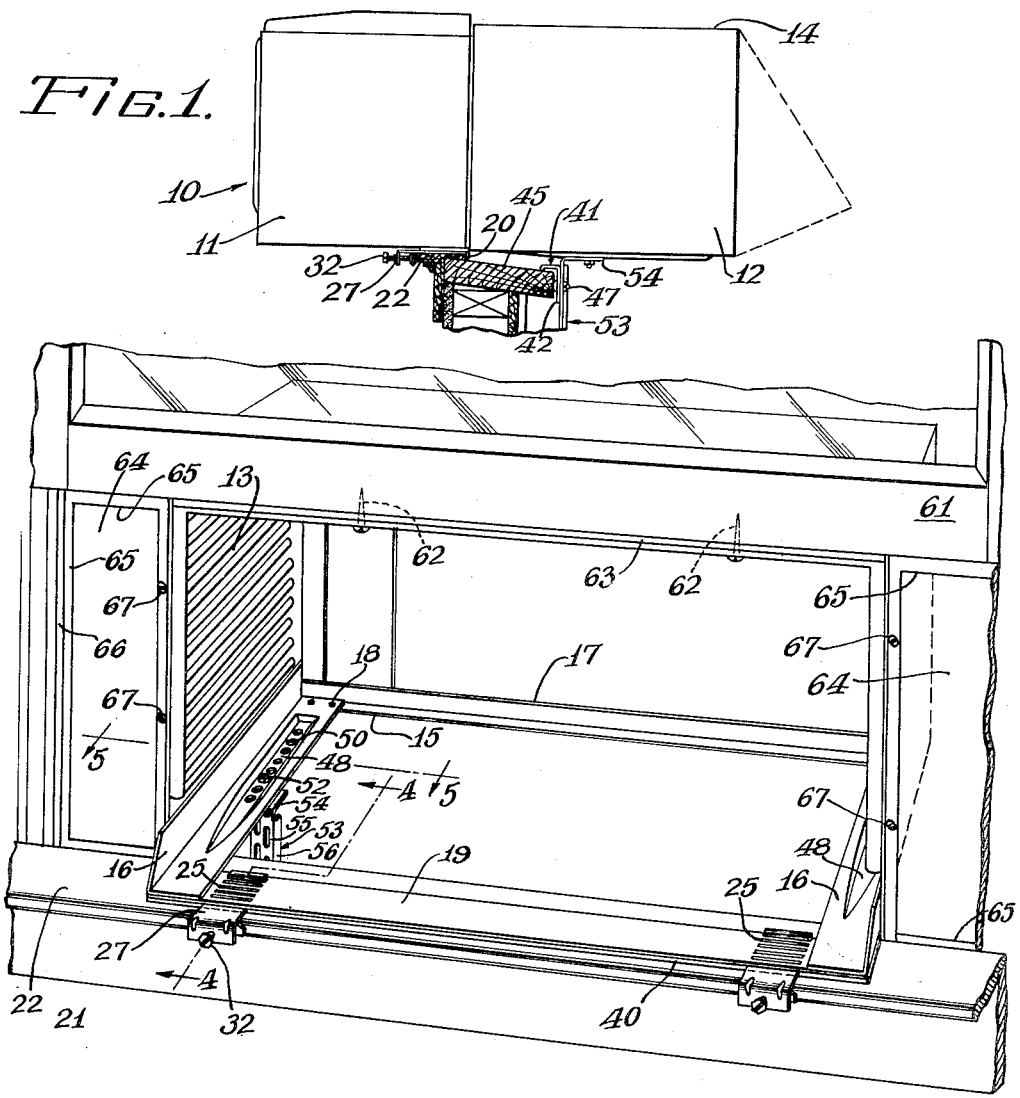
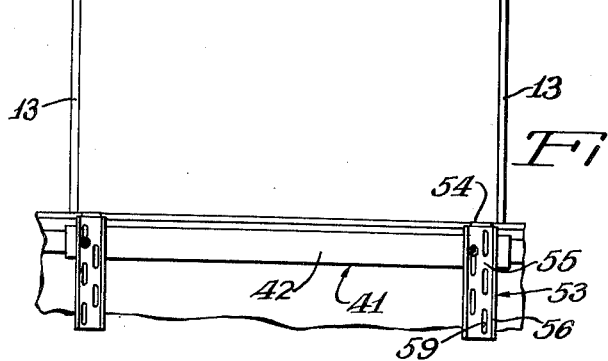
INVENTORS.
Joseph A. Galazzi
Arvel R. Harris
BY Paul O. Pippel
Atty.

April 6, 1954   J. A. GALAZZI ET AL   2,674,430
SUPPORT FOR AIR CONDITIONING APPARATUS
Filed Nov. 24, 1950   3 Sheets-Sheet 3

INVENTORS:
Joseph A. Galazzi
Arvel R. Harris
BY
Paul O. Pippel
Atty.

Patented Apr. 6, 1954

2,674,430

UNITED STATES PATENT OFFICE 2,674,430

SUPPORT FOR AIR CONDITIONING APPARATUS

Joseph A. Galazzi and Arvel R. Harris, Evansville, Ind., assignors to International Harvester Company, a corporation of New Jersey Application November 24, 1950, Serial No. 197,448

6 Claims. (Cl. 248—236)

This invention relates to air conditioning apparatus but more particularly to the structure employed for mounting and supporting such apparatus in a window opening.

Heretofore many different types of structures have been employed for the purpose of fixedly positioning a window-type room air conditioning unit in a window opening, but no attempt appears to have succeeded in producing a simplified removable structure that is sufficiently flexible and suitable for use with a multitude of differently dimensioned window frames. Usually the mounting structures provided are suitable for use only with a few conventional dimensioned window frames, thus when other sized frames are encountered some makeshift adaptor arrangement has to be employed. Such arrangements generally necessitate marring the appearance and finish of window frames so that when the air conditioning unit is removed, as it generally is during the winter months, the unsightly condition resulting therefrom becomes particularly objectionable. Furthermore, since most modern window type air conditioning units are intended for removal during the cooler season, it is, of course, quite desirable that some simple and easily operable means be provided to facilitate such removal and thus reduce maintenance cost thereon. Bearing this in mind, a great deal of work has also been done by many manufacturers in an effort to provide a structure simple enough to be installed by the average home owner and yet sufficiently rugged to support such a heavy unit in comparative safety under all conditions. Up to the present time, however, no structure has been produced which satisfactorily meets all the foregoing requirements of a supporting and mounting structure for a window-type room air conditioning unit.

The principal object of the invention, therefore, is to provide a simplified mounting and supporting structure suitable for removably positioning an air conditioning unit in a window opening.

Another object is to provide a mounting and supporting structure for a window type air conditioning unit that is highly flexible and readily adaptable for use with window frames of varying dimensions.

A further object is to provide a mounting and supporting structure for a window-type air conditioning unit that permits the installation of said unit in a window frame without damaging said frame or marring the appearance thereof.

A still further object is to provide a supporting structure for a window-type air conditioning unit that is simple and easy to install and equally simple and easy to remove.

Another object is to provide a mounting and supporting structure for a window type air conditioning unit that may be completely installed or removed from inside the building window, thus removing the need for outside ladders, scaffolding or like structures.

A yet still further object is to provide a mounting and supporting structure for a window-type air conditioning unit that includes adjustable clamp means disposed within the building for adapting said structure to window frames of varying dimensions.

A further important object is to provide a mounting and supporting structure for a window-type air conditioning unit that is adapted for affixment in clamping relationship to a building window frame without necessitating attachment upon, or other support from, the building wall.

The foregoing and other objects and advantages of the invention will become apparent as the disclosure is more fully made in the following detailed description of a preferred embodiment of the invention as illustrated in the accompanying drawings in which:

Fig. 1 is a side elevation of an air conditioning unit that is mounted and supported in a window opening by means of the present invention.

Fig. 2 is a perspective view of the window box portion of an air conditioning unit mounted in accordance with the present invention.

Fig. 3 is a rear elevation or outside view of the unit shown in Fig. 1.

Figure 4:
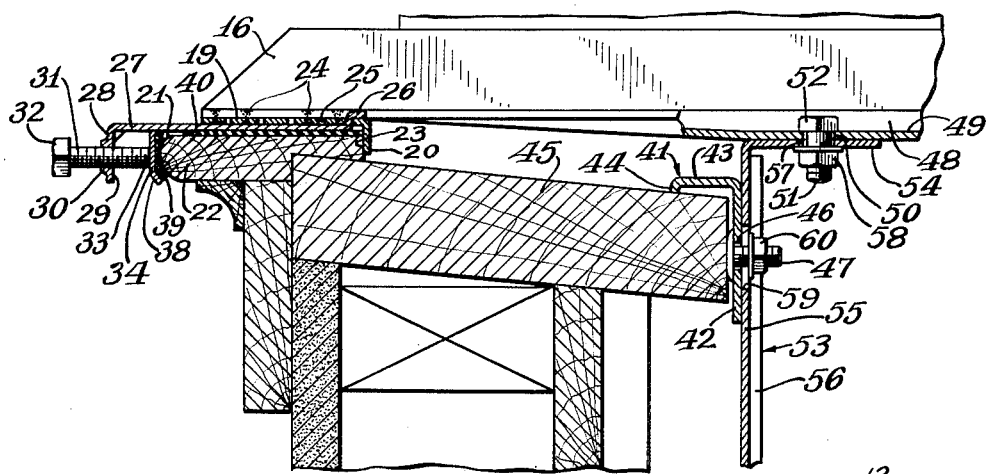
Fig. 4 is an enlarged section taken on line 4—4 of Fig. 2, and shows the supporting structure in more detail.
Figure 5:
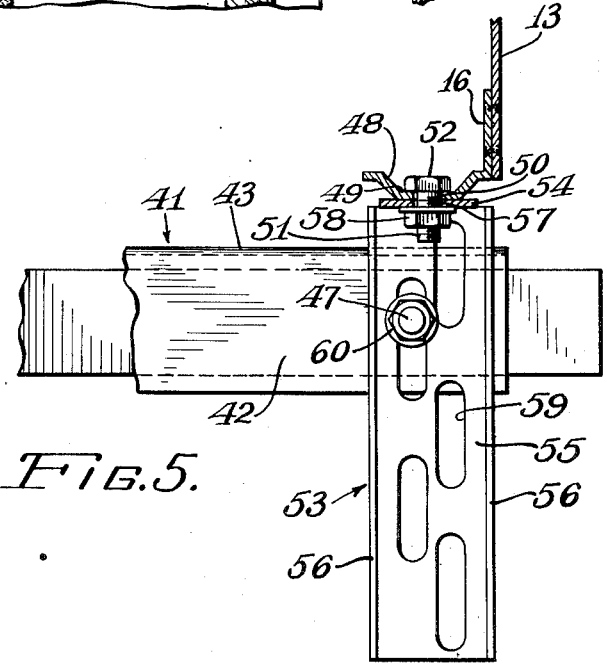
Fig. 5 is an enlarged section taken on line 5—5 of Fig. 2 and shows the window box support portion of the structure in greater detail.

Referring now to the drawings, it will be noted that the preferred embodiment of a window-type air conditioning unit has been indicated generally by the numeral 10. Such unit may include a room cabinet portion 11 that projects into the room being cooled, and a window box portion 12 that extends outside the room and usually into the outside atmosphere. The refrigerating apparatus, as is well understood in the art, extends partially within the room cabinet and partially within the window box, but, since it is not essential to the present invention, it has not been illustrated in the drawings and no further reference thereto is believed to be necessary in the detailed description.

Figure 7:
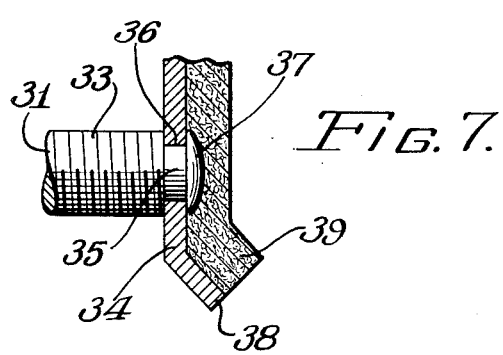
Fig. 7 is an enlarged fragmentary sectional view showing the detail of the clamp jaw connection with its associated adjusting screw.

The window box 12 is an open ended casing having louvers in the side walls 13 thereof, a solid top 14 and an open bottom 15. Affixed, as by welding or the like, to the lower portion of each side wall 13 is a horizontally extending L-shaped angle guide rail member 16. One such member on each side wall, when positioned in opposed relation, may function as a track along which the remainder of the unit may slide as it is inserted and removed from the window box. A small L-shaped angle rail member 17 interconnects the outward or rear ends of said guide rails 16 and is secured thereto by any suitable means, such as the spot welds indicated at 18. At the forward or room end these guide rails are connected together by a substantially flat rail member 19 having a small depending flange 20 along its rearward edge. This latter rail member is adapted to rest on the upper horizontal face 21 of a window stool 22 while its depending flange 20 abuts the rear vertical face 23 of said stool. Said rail member 19 may be fixedly secured to the side guide rails 16 by any suitable means, such, for instance, as the spot welds indicated at 24. This forward rail member 19 is further provided with a plurality of slotted openings 25, proximate each end thereof, that are adapted to receive the hooked end 26 of a clamp member 27. The opposite end 28 of said clamp is bent downwardly and provided with an opening 29 over which is fixedly positioned a raised boss 30 and both the boss 30 and flanged end 28 are threaded to receive an adjusting screw 31 having, preferably a hexagonal-shaped head 32 on one end thereof. The opposite end portion 33 of said screw rotatably engages a clamp jaw member 34, and, although any suitable means may be utilized for engaging said jaw member, the simplified arrangement (Fig. 7) illustrated herein, preferably, embraces positioning a reduced end portion 35, of the screw 31, through an opening 36, in the jaw 34, and then peening over the end of said screw to provide a button-like retaining head 37. The lower edge of said jaw, preferably, is bent over approximately 45° to provide a lip or flange 38 that functions to improve the grip of said jaw and thus prevent vertical slippage thereof when it is tightly pressed against the curved edge of a window stool. A pad 39 of felt, or some equally suitable cushioning material, may be placed between the face of the jaw 36 and the edge of the stool 22, so as to avoid marring the surface thereof, and a similar pad 40 may, if desired, also be positioned under the rail member 19 to protect the upper surface 21 of the window stool.

The outside portion of the supporting structure, i. e. that portion disposed outside the window, includes a sill mounting member 41, extending the width of the window box, that is fashioned, preferably with a vertical member 42 and a horizontal member 43 extending from the upper edge thereof. Downwardly depending from the inner edge of said horizontal member is a flange 44 which is adapted for resting on the upper surface of a window sill 45. An opening 46 (Figs. 4 and 6) near each end of said angle member is adapted to receive in a tight fitting relationship, for purposes which will presently be explained, a flat headed bolt 47.

Each guide rail member 16 is fashioned, preferably with a pressed-out canal-like groove or recess 48 that extends longitudinally along the central portion of its horizontal member. The bottom or floor 49 of said recess is provided with a plurality of openings 50 spaced throughout the length thereof. Thus, when a cap screw, such as 51, is placed in any one of said openings the head 52 thereof will rest in the recess 48 without interfering with the remainder of the air conditioning unit as it is slidably moved along the guide rail members 16 into and out of the window box. The window box support member 53 is an L-shaped angle having a horizontal arm 54 and a vertical arm 55. The vertical edges of said vertical arm may, if desired, be bent over to provide reinforcing flanges 56. A slotted opening 57 in the horizontal arm 54, of said member, is adapted to receive the cap screw 51 which, together with the nut 58, operates to secure said support member in a desired fixed horizontal relation with respect to the guide rail member 16. The vertical arm 55, of the support member 53, is provided with a plurality of slotted openings 59 adapted to receive a bolt 47 which, together with the nut 60, operates to fixedly retain said support member in any one of a multitude of different vertical positions. With both vertical and horizontal adjustments being obtainable it will be appreciated that a great many combinations of positions may be effected and the structure adjusted to accommodate many differently dimensioned window openings and window frames. It will be understood, of course, that a window box support member such as 53 is associated with each side guide rail member, but since both members are identical only one has been described in detail.

After the window box 12 has been properly positioned on the window sill and the jaw 34 of the clamp tightly pressed against the window stool the window sash 61 may be tightly pressed against the top of the window box and retained in such position by screws 62. A resilient gasket 63 may, if desired, be positioned between the window sash and the top of the window box in order to effect a better air seal therebetween. Filler pieces 64 having a resilient gasket 65 along the edge thereof may be positioned to seal the space between the side of the window frame 66 and the side of the window box 12, and may be removably secured therebetween by any suitable means such as the screws 67.

Figure 6:
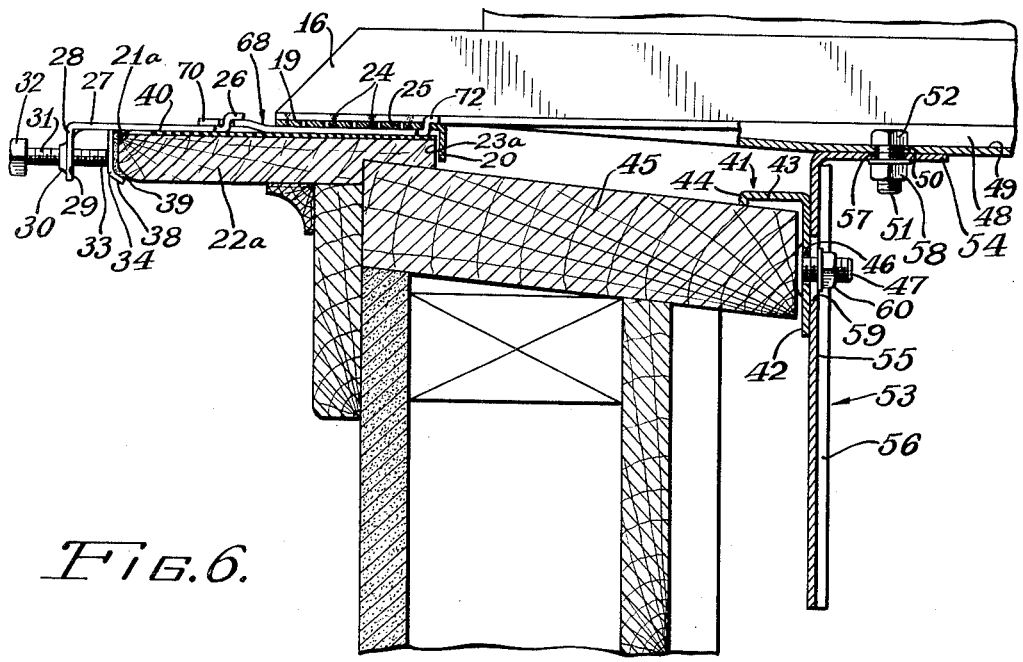
Fig. 6 is an enlarged section, similar to Fig. 4, showing a modification wherein an extension member is employed to permit use of the invention with an unusually wide window stool.

In Fig. 6 is illustrated a modification of the present invention wherein the mounting and clamping structure has been altered in order to adapt said structure to a window frame having an unusually wide window stool. Although the present invention is adaptable for use with window frames incorporating window stools of various conventional widths it will be noted that it may likewise find additional use with unusually wide window stools, such as illustrated in Fig. 6, merely by using one or more extension members that are readily attachable to the ends of the clamp members. In the modified embodiment illustrated like reference characters have been applied to similar members illustrated in the preferred embodiment of the structure.

Figure 8:
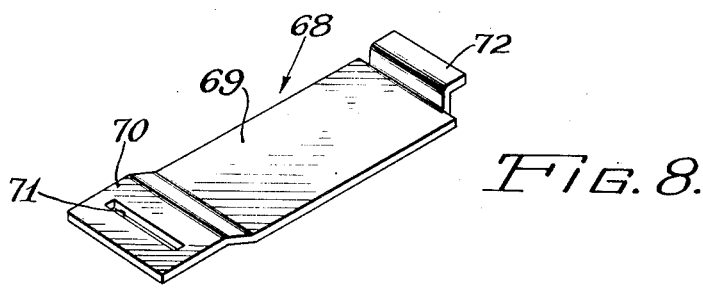
Fig. 8 is a perspective view of the extension member used with the clamping device when mounted on a window frame having an unusually wide stool.

A window stool 22a of unusual or greater than conventional dimension in width is shown as including an upper horizontal surface 21a and an outer or rear vertical face 23a and is disposed in a frame having a conventional sill 45. An extension clamp member, shown in perspective in Fig. 8, and indicated generally by the numeral 68, includes a central substantially flat member 69 connected between upwardly offset portions on opposite ends thereof. One end portion 70, preferably, is slightly offset and provided with a slotted opening 71 therein while the opposite end has a reduced section that is bent upwardly and then outwardly to provide a hook-like offset 72 thereon. This extension member is provided for the purpose of bridging the space between the hooked end 26, of the clamp member 27, and the slotted openings 25 in the transverse rail member 19 when the stool is too wide to permit insertion of said hooked end 26 directly into any one of said openings 25.

In use it is merely necessary to set up the window box 12, as previously described, and then insert the hooked end 72, of the extension member 68, in one of the slotted openings 25 in said rail member 19 while the hooked end 26, of the clamp member 27, is inserted in the slotted opening 71 in the opposite end of said extension member. One or more such extension members it will be understood are provided for each clamp member. Upon affixment of said extension members in place the clamps may then be tightened against the inner vertical face of the window stool, as previously described, whereupon the window box structure is rigidly mounted and ready to receive an air conditioner unit therein.

From the foregoing it will be readily appreciated that the present invention provides a very simple and sturdy means for supporting a window type air conditioning unit in a window opening; one that is easily installed and readily removed with the aid of only the simplest tools; and, furthermore, a structure that is extremely flexible and suitable for use with a multitude of differently dimensioned window frames. It is to be understood, of course, that changes may be made in the construction without departing from the spirit of the invention or the scope thereof as defined in the appended claims.

What is claimed is:

1. A structure for mounting a refrigerating unit in the window of an enclosure to be air cooled and formed to encompass said unit, including: a housing having a top wall, opposed side walls, a rectangular frame affixed between said side walls, said frame being fashioned to provide confining guide members adapted to receive a refrigerative conditioning unit slidably positioned therebetween; a flange depending from said frame adapted to engage the outer edge of the window stool; said frame being further provided with a series of spaced slotted openings proximate opposite ends thereof; means, including members having at least one end thereof hooked for insertion in said frame slots, for detachably affixing said housing to the window stool; and bracket means adjustably affixed to the housing frame and adapted for mounting on the window sill.

2. A structure for mounting a refrigerating unit in the window of an enclosure to be air cooled and formed to encompass said unit, including: a shell having a top wall, opposed side walls and a horizontally disposed rectangular frame affixed between said side walls; said frame having a longitudinally extending angle member having a depending flange along one edge thereof adapted to engage the outer edge of the window stool, and a flat horizontal member fashioned with a series of spaced slotted openings proximate each end thereof adapted to rest on the window stool; clamping means detachably affixed in said slotted openings and adapted to engage the inner edge of the window stool; a supporting sill angle member adapted to rest on the window sill and overhang the edge thereof; and bracket means adjustably affixed to said frame and adapted for adjustable securement to said sill angle.

3. A structure for mounting a refrigerating unit in the window of an enclosure to be air cooled and formed to encompass said unit, including: a shell having a top wall, opposed side walls and a horizontally disposed rectangular frame affixed between said side walls; said frame having a longitudinally extending angle member having a depending flange along one edge thereof adapted to engage the outer edge of the window stool, and a flat horizontal member fashioned with a series of spaced slotted openings proximate each end thereof adapted to rest on the window stool; clamping means having one end thereof detachably affixed in said slotted openings and having the opposite end thereof provided with an adjustable clamping device adapted for securely engaging the inner edge of the window stool, a supporting sill angle member adapted to rest on the window sill and overhang the edge thereof; and bracket means adjustably affixed to said frame and adapted for adjustable securement to said sill angle.

4. A structure for mounting a refrigerating unit in the window of an enclosure to be air cooled and formed to encompass said unit, including: a housing having a top wall, opposed side walls, and a rectangular frame affixed between said side walls; said frame being fashioned to provide confining guide members adapted to receive a refrigerative conditioning unit slidably positioned therebetween; each of said guide members being provided with a longitudinal recess and having spaced openings in the floor thereof; said frame including a forwardly disposed longitudinally extending angle member having a depending flange along one edge thereof adapted to engage the outer vertical edge of a window stool, and a flat horizontal member having a series of spaced slotted openings proximate each end thereof and adapted for resting upon a window stool; clamping means provided with a Z-shaped offset on one end thereof for detachable affixment in one of said slotted openings while the opposite end thereof is provided with an adjustable universally anchored abutting member adapted for securely engaging the inner vertical edge of a window stool; a supporting sill angle member adapted to rest on top of a window sill and additionally overhang an outer edge thereof; and bracket members detachably affixed to said housing by securing means anchored in said recesses, and adapted for adjustable securement to said sill angle.

5. In a unit air conditioner of the type mounted partially on a window stool and partially on a window sill beneath a raised sash, the combination of a supporting housing adapted to be mounted on a stool and sill; said housing having confining guide members adapted to receive a refrigerative air conditioning unit slidably positioned therebetween; means for mounting said housing on the window stool including, clamp members detachably secured at one end thereof to the housing and adjustably engaging an inner edge of the stool at the opposite ends thereof, and a flange member affixed to the housing and engaging an outer edge of the stool; and additional means for supporting said housing on the sill including, a sill angle member having a horizontal arm adapted for resting on an upper and substantially horizontal surface of the sill and a vertical arm overhanging in abutting relation an outer vertical edge of the sill, and bracket means adjustably affixed to said housing and further adjustably secured to the vertical arm of said sill angle member.

6. A structure for mounting a refrigerating unit in the window of an enclosure to be air cooled and formed to encompass said unit, including: a housing having a top wall, opposed side walls, and a rectangular frame affixed between said side walls; said frame being fashioned to provide confining guide members adapted to receive a refrigerative air conditioning unit slidably positioned therebetween; a flange depending from said housing and adapted to engage an outer vertical edge of a window stool; clamp means detachably affixed at one end thereof to said frame and adapted to have the opposite end thereof adjustably engage an inner edge of a window stool; a supporting sill angle member having a horizontal arm adapted to rest on an upper and substantially horizontal surface of a window sill and a vertical arm overhanging in abutting relation an outer edge of a window sill; and bracket means adjustably affixed at one end thereof to said housing frame and adapted for adjustable securement at the opposite end thereof to the vertical arm of said sill angle member.

References Cited in the file of this patent

UNITED STATES PATENTS

| Number | Name | Date |
|---|---|---|
| 1,921,401 | Weiler | Aug. 8, 1933 |
| 2,080,261 | Funk | May 11, 1937 |
| 2,316,704 | Moore | Apr. 13, 1943 |
| 2,335,627 | Wolfert | Nov. 30, 1943 |
| 2,536,901 | Bearden | Jan. 2, 1951 |